United States Patent [19]
Radys et al.

[11] Patent Number: 6,104,169
[45] Date of Patent: Aug. 15, 2000

[54] BATTERY CHARGING SYSTEM THAT CONTROLS CHARGING POWER USING FOURTH ELEMENT CAPACITORS

[75] Inventors: Ray G. Radys, Santa Monica; John T. Hall, Woodland Hills, both of Calif.

[73] Assignee: General Motors Corporation, Detroit, Mich.

[21] Appl. No.: 09/377,527

[22] Filed: Aug. 19, 1999

[51] Int. Cl.[7] ................................. H01M 10/46
[52] U.S. Cl. ........................................... 320/138
[58] Field of Search .................... 320/108, 109, 320/128, 137, 138, 140, FOR 148, FOR 149, DIG. 23

[56] References Cited

U.S. PATENT DOCUMENTS

| | | | |
|---|---|---|---|
| 5,803,215 | 9/1998 | Henze et al. | 191/2 |
| 5,821,755 | 10/1998 | Henze | 324/426 |
| 5,926,004 | 7/1999 | Henze | 320/109 |

*Primary Examiner*—Edward H. Tso
*Attorney, Agent, or Firm*—Anthony Luke Simon

[57] ABSTRACT

A battery charging system for charging a battery of an electric vehicle that is coupled to a charge probe by way of a diode bridge and a fourth element capacitor. The system includes a voltage source and a plurality of battery chargers connected in parallel across the voltage source that each includes a series tank circuit and an isolation transformer. The charge probe is coupled to the isolation transformers of the parallel plurality of battery chargers. A distributed fourth element capacitor is coupled across the isolation transformers of each of the parallel plurality of battery chargers.

2 Claims, 3 Drawing Sheets

BATTERY CHARGING SYSTEM THAT CONTROLS CHARGING POWER USING FOURTH ELEMENT CAPACITORS

BACKGROUND

The present invention relates generally to electric vehicle charging systems, and more particularly, to an improved system for controlling charging power in electric vehicle charging systems.

The assignee of the present invention designs and develops electric vehicle charging systems. An inexpensive and simple way to charge an electric vehicle battery at high power is to parallel several resonant chargers. Unfortunately, as more and more chargers are connected in parallel, the output power per stage drops considerably. It has been determined that this effect can be neutralized by adding distributed fourth element capacitors to each charger stage using the principles of the present invention.

Three element resonant chargers have been used in the past. Such three element resonant chargers have the following limitations. The three element resonant chargers cannot throttle down to zero power as is required in a trickle charge mode. The three element resonant chargers do not provide a voltage boosting effect. The three element resonant chargers lose a lot of power capability when stages are parallelled.

Four element chargers have been used in the past. Such four element chargers can throttle down to zero power, but they also lose power when stages are connected in parallel. The present invention provides for a solution to this problem.

It would therefore be desirable to have an improved system for controlling charging power in electric vehicle charging systems.

SUMMARY OF THE INVENTION

The present invention provides for an improved charging system wherein a plurality of parallel resonant chargers are used to charge an electric vehicle battery. In using conventional parallel resonant chargers, as more and more chargers are connected in parallel, the output power per stage drops considerably. This effect is neutralized in accordance with the present invention by adding distributed fourth element capacitors to each charger stage. Thus, a large amount of battery charging power is efficiently controlled by adding a relatively small amount of capacitance to each charging stage.

More particularly, the present invention provides for a battery charging system for charging a battery of an electric vehicle. The battery is coupled to a charge probe 5 by way of a diode bridge and a fourth element capacitor. The system comprises a voltage source, and a plurality of battery chargers connected in parallel across the voltage source. Each of the battery chargers comprise a series tank circuit and an isolation transformer. A charge probe is coupled to the isolation transformers of the parallel plurality of battery chargers. A distributed fourth element capacitor is coupled across the isolation transformers of each of the parallel plurality of battery chargers.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DETAILED DESCRIPTION

Figure 1:
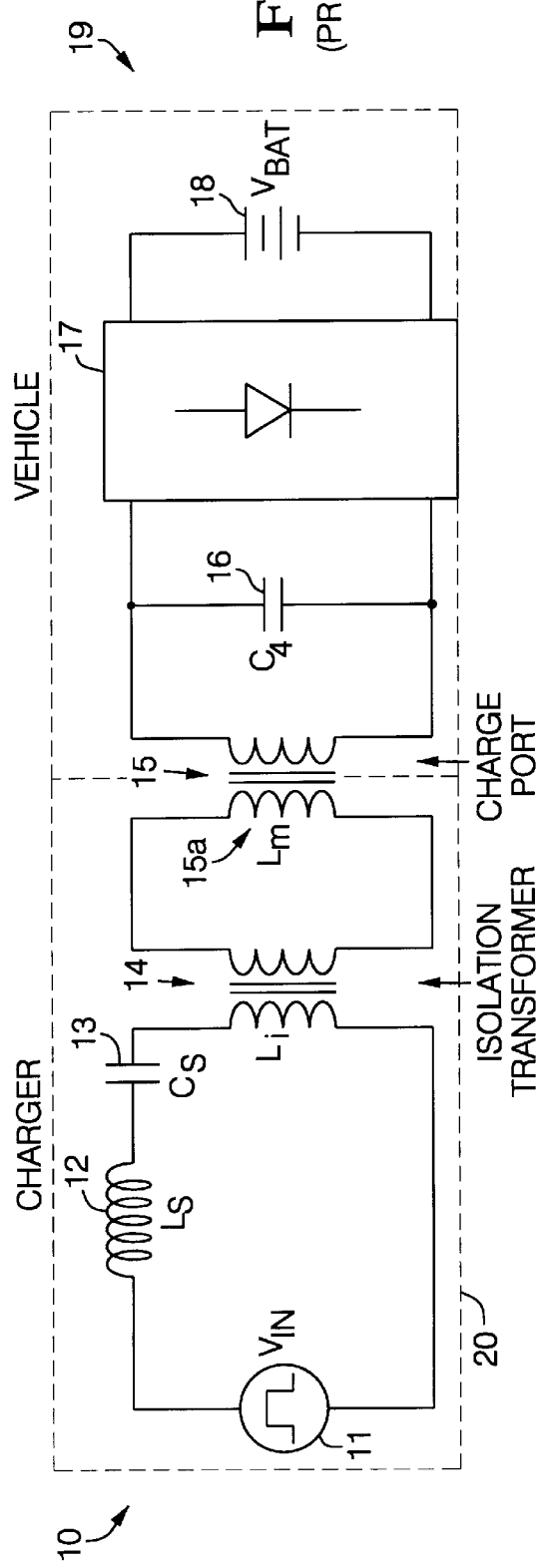
FIG. 1 illustrates a conventional battery charging system used to charge a battery inside an electric vehicle in accordance with the principles of the present invention.

Referring to the drawing figures, FIG. 1 shows a conventional battery charging system 10 used to charge a battery 18 inside an electric vehicle 19. The battery charging system 10 comprises a battery charger 20 comprising a voltage source 11 ($V_{IN}$), a series tank circuit 12 ($Z_S$) including a series inductor 13a ($L_S$) and series capacitor 13b ($C_S$), an isolation transformer 14 ($L_i$) and a charge probe 15a which is an input coupler that is inserted into a charge port 15b.

The charge probe 15a and charge port 15b form a coupling transformer that couples power from the voltage source 11 ($V_{IN}$) to the battery 18. The voltage source 11 ($V_{IN}$) is a high frequency square wave that is generated from a 60 HZ utility outlet.

The charge port 15b is coupled by way of a fourth element capacitor 16 ($C_4$) and a diode bridge 17 to the battery 18. The fourth element capacitor 16, diode bridge 17 and the battery 18 are located inside the electric vehicle 19.

The charge port 15b is an inductive coupler used to transfer power. The purpose of the isolation transformer 14 is to allow parallel stages even when the voltage source 11 ($V_{IN}$) is generated from different phases in a three phase AC system.

Figure 2:
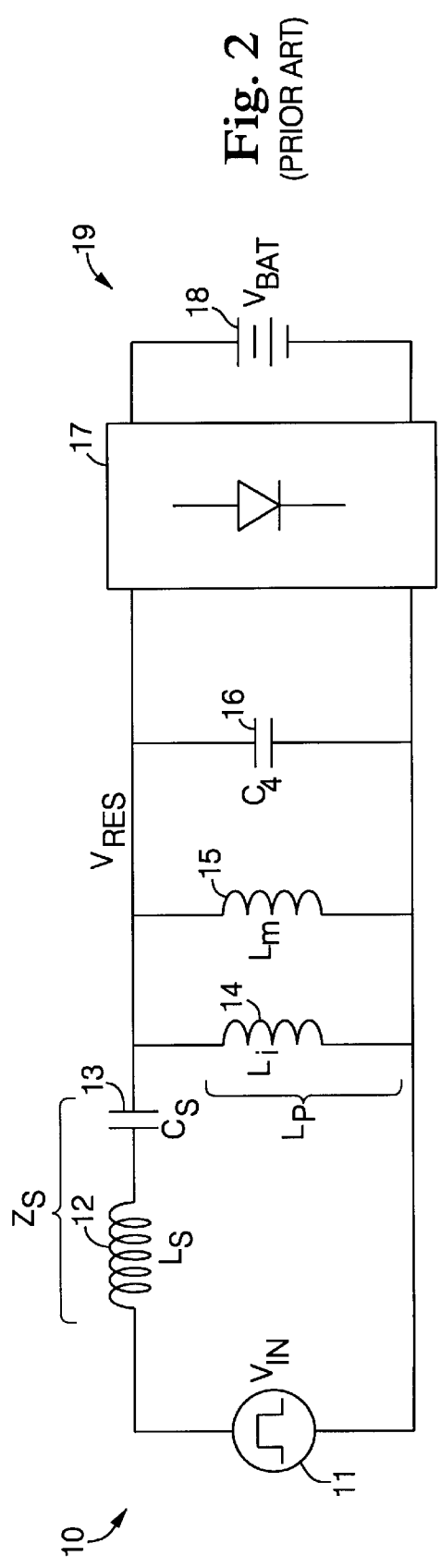
FIG. 2 illustrates a simplified model of the conventional battery charging system of FIG. 1.

FIG. 2 shows a simplified model of the battery charging system 10 shown in FIG. 1. If the isolation transformer 14 ($L_i$) is ignored, then the battery charging system 10 forms a four element series/parallel resonant converter. This converter contains two tank circuits. The series tank circuit ($Z_S$) includes the series inductor 13a ($L_S$) and the series capacitor 13b ($C_S$). The parallel tank circuit (Zp) includes the charge probe 15a ($L_m$) and the fourth element capacitor 16 ($C_4$). The ratio of Zs/Zp is the key to understanding why the fourth element capacitor 16 ($C_4$) raises power at low frequencies, decreases power at high frequencies, and causes a power drop when stages are connected in parallel.

Figure 3:
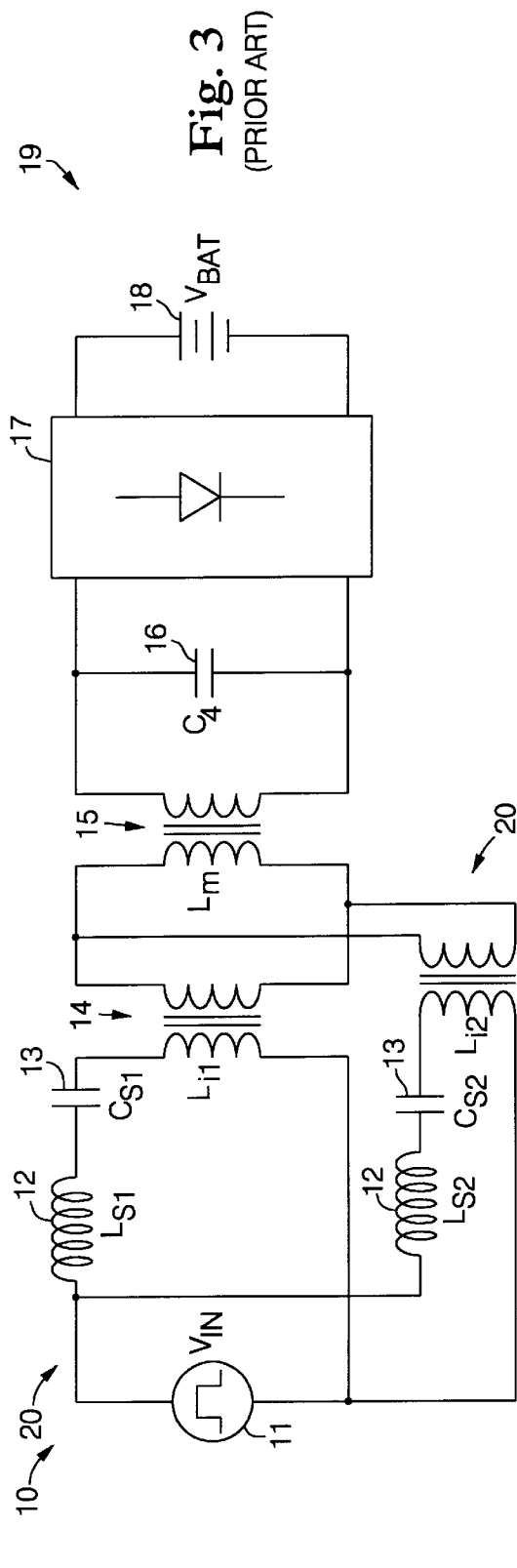
FIG. 3 illustrates a conventional battery charging system having two paralleled chargers supplying power to a single charge port.
Figure 4:
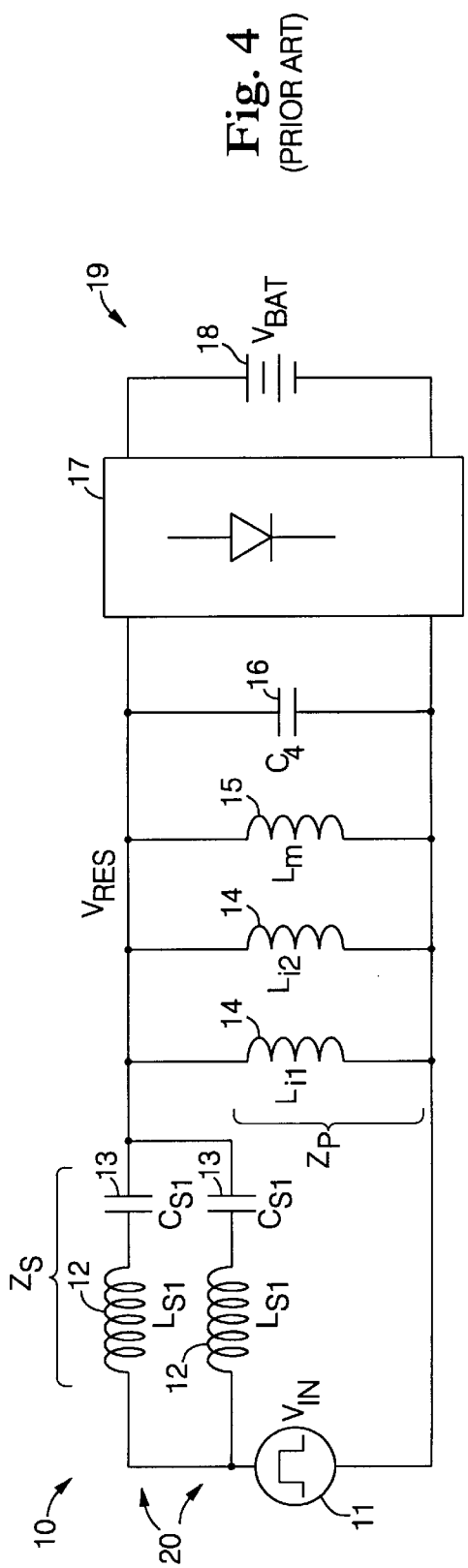
FIG. 4 shows a simplified model of the conventional battery charging system shown in FIG. 3.

FIG. 3 illustrates a conventional battery charging system 10 having two battery chargers 20 connected in parallel supplying power to a single charge port 15b. FIG. 4 shows a simplified model of the battery charging system 10 shown in FIG. 3. In FIG. 4 the capacitance of the series capacitor 13b ($C_S$) is doubled while the inductance of the series inductor 13a ($L_S$) is cut in half. As a result, the impedance of the series resonant tank circuit ($Z_S$) remains the same. The impedance of the series tank circuit ($Z_S$) drops in half, but the impedance of the parallel tank circuit (Zp) does not drop in half. The size of the isolation transformer 14 ($L_i$) is usually about 10 times as large as the size of the charge probe 15a ($L_m$). The total inductance goes from Lm||Li to Lm||Li||Li||. The capacitance of the fourth element capacitor 16 ($C_4$) does not change at all. As a result, the size of the parallel tank circuit (Zp) only goes down by a small amount. This causes the ratio of Zs/Zp to fall. This causes a loss of power per stage. There are two ways to explain this.

The resonant voltage ($V_{RES}$) shown in FIG. 4 is often unloaded because diodes of the diode bridge 17 will be reverse biased. As a result, the resonant current ($I_{RES}$) flowing through the series tank circuit ($Z_S$) must build up by flowing through the parallel tank circuit (Zp). To double output power, the resonant current ($I_{RES}$) must double. However, when the battery 18 is unclamped, the resonant current ($I_{RES}$) can only double if both the impedance of the series tank circuit ($Z_S$) and the impedance of the parallel tank circuit (Zp) drop in half. But, as was stated previously, only the impedance of the series tank circuit ($Z_S$) drops in half.

Another way to see this loss of power is a bit more complex. The topology of the battery charging system 10 shown in FIG. 4 has some of the characteristics of a boost converter. It can provide voltage gain even if 1 to 1 transformers are used. In this topology, $V_{CS}$ is small compared to $V_{LS}$. Therefore, the series inductor 13a ($L_S$) acts as a boost inductor. The diode bridge 17 acts as a boost flyback diode. The changing voltage across the parallel tank circuit (Zp) acts as a boost switch. When the diodes are reverse biased, Ls charging current flows through Zs and the parallel tank circuit (Zp). When the diodes are forward biased, the series tank circuit ($Z_S$) discharges through the battery. The Ls discharge current can only be high if the series tank circuit ($Z_S$) charging current is high. This can only occur if both the series tank circuit ($Z_S$) and the parallel tank circuit (Zp) are low. If the parallel tank circuit (Zp) cannot keep up with Zs then power is lost. Since $V_{LS}$ can become as high as 2*Vin, voltage gains of as much as two are achievable with this topology, but only if the parallel tank circuit (Zp) is kept low by using a lot of the fourth element capacitor 16 ($C_4$).

Figure 5:
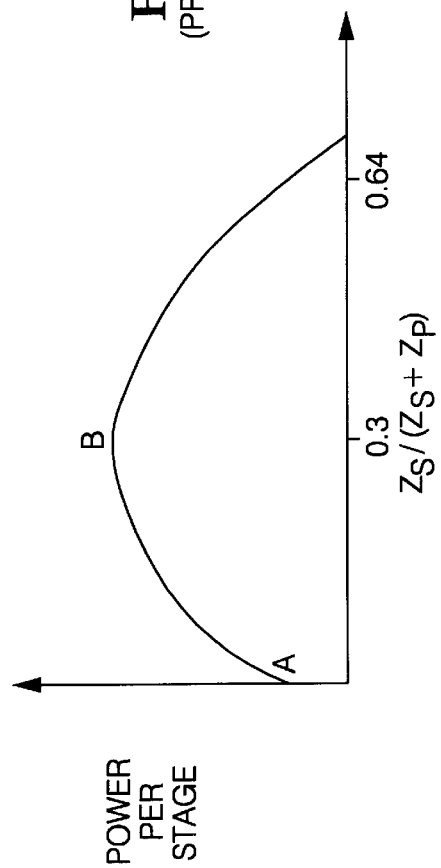
FIG. 5 is a graph that shows how power per stage changes in a conventional paralleled system.
Figure 6:
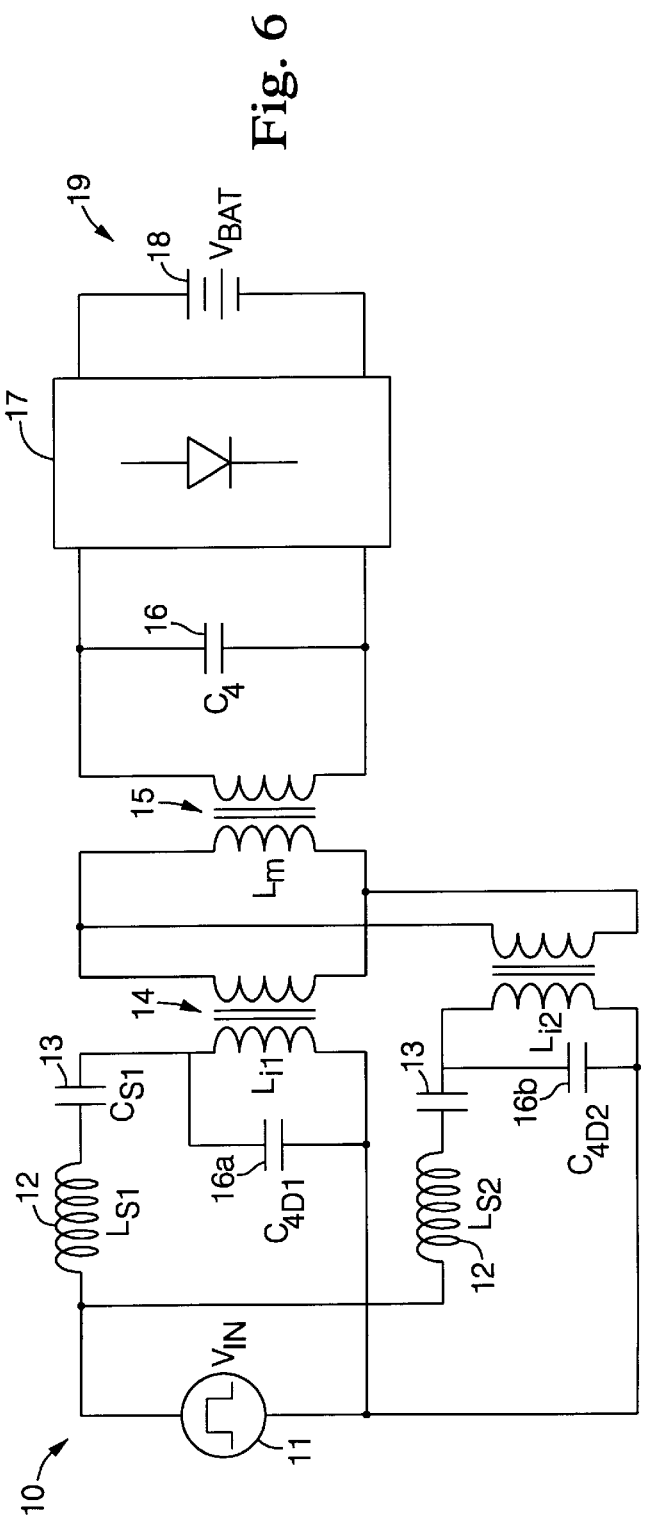
FIG. 6 illustrates an exemplary battery charging system in accordance with the principles of the present invention.

FIG. 5 shows how power per stage changes in a paralleled system 10 via the ratio of Zs/(Zs+Zp). Assume a single stage with a ratio of about 0.3. Power then peaks as shown in FIG. 5 at point B. If the $V_{IN}$ frequency is increased, the fourth element capacitor 16 ($C_4$) looks like a short. This causes the value of the parallel tank circuit (Zp) to fall faster than the value of the series tank circuit ($Z_S$) thereby causing $V_{RES}$ in FIG. 2 to fall. Once $V_{RES}$ falls below $V_{BAT}$, then no power is supplied to the battery 18. This occurs at point C in FIG. 5. In this case, the fourth element capacitor 16 ($C_4$) helps to throttle power down to zero.

In order to get a maximum power transfer, $V_{RES}$ must be large so as to increase $I_{RES}$, but it cannot be too large. If the current $I_{RES}$ becomes too large, then $V_{RES}$ gets too close to $V_{BAT}$, thereby cutting of power to the battery 18. As a result, there is only one optimum power point which is shown as point B in FIG. 5.

If operation is at point B and more and more stages are connected in parallel, then the value of the series tank circuit ($Z_S$) becomes smaller and smaller compared to the value of the parallel tank circuit (Zp). As previously described, this leads to a loss of power. This is shown as a fall from point B to A in FIG. 5. To compensate for this and move from point A back to point B, the value of the parallel tank circuit (Zp) must be decreased. This can be done by increasing the value of the fourth element capacitor 16 ($C_4$). Unfortunately, the fourth element capacitor 16 ($C_4$) is inside the electric vehicle 19 and cannot be changed.

In accordance with the principles of the present invention, one way around this is to add distributed fourth element capacitors 16a ($C_{4D}$) to each charger stage 20. The distributed fourth element capacitors 16a ($C_{4D}$) are shown as capacitors 16a ($C_{4D1}$, $C_{4D2}$), etc. The distributed capacitors 16a ($C_{4D1}$, $C_{4D2}$) reflect back to the fourth element capacitor 16 ($C_4$) thereby decreasing the value of the parallel tank circuit (Zp) and increasing power. In an embodiment of the present invention that was reduced to practice, the capacitance value of the fourth element capacitor 16 ($C_4$) was 39 nF and the capacitance values of the distributed fourth element capacitors 16a ($C_{4D}$) was 5.6 nF.

Thus, by using the present invention, a large amount of battery charging power is efficiently controlled by adding a relatively small amount of capacitance to each charging stage 20. The present invention has been reduced to practice and has proven to work. Adding the distributed fourth element capacitors 16a ($C_{4D}$) leads to a small amount of high frequency ringing in the charging system 10. Electrical filters (not shown) may be used to damp out this ringing.

From the above discussion is should be clear that key aspects of the present invention include the use of non-distributed and distributed fourth element capacitors 16, 16a to decrease charging power to zero at high frequency, the ability to increase charging power at low frequency, and the ability to compensate for loss of power when paralleling multiple chargers 20.

Thus, an improved system for controlling charging power in electric vehicle charging systems have been disclosed. It is to be understood that the above-described embodiment is merely illustrative of one of the many specific embodiments that represent applications of the principles of the present invention. Clearly, numerous and other arrangements can be readily devised by those skilled in the art without departing from the scope of the invention.

What is claimed is:

1. A battery charging system for charging a battery of an electric vehicle that is coupled to a charge probe by way of a diode bridge and a fourth element capacitor, the system comprising:
    a voltage source);
    a plurality of battery chargers connected in parallel across the voltage source that each comprise a series tank circuit and an isolation transformer;
    a charge probe coupled to the isolation transformers of the parallel plurality of battery chargers; and
    a distributed fourth element capacitor coupled across the respective isolation transformers of each of the parallel plurality of battery chargers.

2. In a battery charging system for charging a battery of an electric vehicle that is coupled to a charge probe by way of a diode bridge and a fourth element capacitor, which system comprises a voltage source, a plurality of battery chargers connected in parallel across the voltage source that each comprise a series tank circuit and an isolation transformer, and a charge probe coupled to the isolation transformers of the parallel plurality of battery chargers, wherein the improvement comprises:
    a distributed fourth element capacitor coupled across the respective isolation transformers of each of the parallel plurality of battery chargers.

* * * * *